United States Patent
Steiner et al.

(10) Patent No.: US 9,327,391 B2
(45) Date of Patent: May 3, 2016

(54) CRIMPING TOOL

(75) Inventors: Richard A. Steiner, East Haddam, CT (US); Joseph Krzyzanski, New Haven, CT (US)

(73) Assignee: OETIKER TOOL CORPORATION, Branford, CT (US)

(*) Notice: Subject to any disclaimer, the term of this patent is extended or adjusted under 35 U.S.C. 154(b) by 938 days.

(21) Appl. No.: 13/363,520

(22) Filed: Feb. 1, 2012

(65) Prior Publication Data

US 2013/0192035 A1  Aug. 1, 2013

(51) Int. Cl.
  *B23P 11/00*  (2006.01)
  *B25B 27/10*  (2006.01)

(52) U.S. Cl.
  CPC .............. *B25B 27/10* (2013.01); *B23P 11/00* (2013.01); *Y10T 29/53709* (2015.01)

(58) Field of Classification Search
  CPC ...................................................... B23P 11/00
  USPC .............. 29/243.5, 237, 268; 72/409.19, 416, 72/453.16, 409.11, 409.12, 116, 216, 217, 72/101, 389.9
  See application file for complete search history.

(56) References Cited

U.S. PATENT DOCUMENTS

| | | | | |
|---|---|---|---|---|
| 1,107,684 A | | 8/1914 | Mallory | |
| 1,724,697 A | * | 8/1929 | Dobrick | 72/116 |
| 2,089,133 A | * | 8/1937 | Parker | 72/317 |
| 2,180,033 A | * | 11/1939 | Cattoi | |
| 2,221,228 A | * | 11/1940 | Maupin | 72/116 |
| 2,350,054 A | * | 5/1944 | McIntosh | 72/317 |
| 2,459,910 A | * | 1/1949 | Alvin | 72/341 |
| 2,505,666 A | * | 4/1950 | Franck | 269/9 |
| 2,774,269 A | * | 12/1956 | Klingler et al. | 72/472 |
| 2,843,924 A | * | 7/1958 | Franck | 72/317 |
| 2,892,480 A | * | 6/1959 | Franck | 72/317 |
| 3,050,103 A | * | 8/1962 | Janik | 72/117 |
| 3,117,617 A | * | 1/1964 | Meese | 72/116 |
| 3,172,454 A | * | 3/1965 | Wilson | 72/416 |
| 3,935,757 A | | 2/1976 | Granberg | |
| 4,043,174 A | | 8/1977 | Paolino | |
| 4,108,589 A | * | 8/1978 | Bunch | 425/393 |
| 4,225,990 A | | 10/1980 | Theiler, Sr. | |
| 4,337,542 A | | 7/1982 | Theiler, Sr. | |
| 4,385,515 A | | 5/1983 | Link et al. | |
| 4,526,023 A | * | 7/1985 | Babb | 72/116 |
| 4,538,443 A | * | 9/1985 | Gooding | 72/416 |
| D289,005 S | * | 3/1987 | Babb | D8/72 |

(Continued)

OTHER PUBLICATIONS

Non-Final Office Action for U.S. Appl. No. 14/183,932 dated Jul. 10, 2015; 1-27 pages.

*Primary Examiner* — Monica Carter
*Assistant Examiner* — Mahdi H Nejad
(74) *Attorney, Agent, or Firm* — Cantor Colburn LLP

(57) ABSTRACT

A tool for crimping a ring member on a pipe is provided. The tool includes a first arm having a plurality of slots on a first side and a second slot on a second side. Each slot of the plurality of slots is a different size diameter, and the at least one second slot has a different size. The tool further includes a second arm operably coupled to rotate. The second arm having a plurality of slots on a third side and at least one fourth slot on a fourth side. Each of the plurality of slots are sized and positioned to cooperate with each other when in the first position to crimp the ring member. The at least one fourth slot is sized and positioned to cooperate with the at least one second slot when in the second position to crimp the ring member.

21 Claims, 9 Drawing Sheets

(56) References Cited

U.S. PATENT DOCUMENTS

| | | | | |
|---|---|---|---|---|
| 4,736,616 A | * | 4/1988 | Scotti | 72/472 |
| 4,825,682 A | * | 5/1989 | Orav et al. | 72/477 |
| 4,848,121 A | | 7/1989 | Rottinghaus | |
| 4,852,866 A | | 8/1989 | Kristoff | |
| 5,596,800 A | * | 1/1997 | Holliday et al. | 29/751 |
| 5,685,085 A | | 11/1997 | Bond | |
| D400,893 S | * | 11/1998 | Peterson | D15/123 |
| 5,966,777 A | | 10/1999 | Jantschek | |
| 6,552,522 B1 | | 4/2003 | Zook | |
| 6,574,837 B2 | * | 6/2003 | Jantschek | 16/371 |
| 6,684,439 B2 | | 2/2004 | Jeske et al. | |
| 6,971,179 B2 | * | 12/2005 | Erbrick | 30/191 |
| 7,490,504 B1 | * | 2/2009 | Hirsch et al. | 72/409.01 |
| 7,628,052 B2 | * | 12/2009 | Zhang | 72/409.16 |
| 7,644,721 B2 | | 1/2010 | Hoberman et al. | |
| D628,036 S | | 11/2010 | Steiner | |
| 7,878,790 B2 | * | 2/2011 | Kidd | 425/318 |
| 8,001,872 B2 | | 8/2011 | Gorrie | |
| 8,015,853 B2 | | 9/2011 | Steiner et al. | |
| D685,239 S | | 7/2013 | Steiner et al. | |
| 8,590,352 B2 | | 11/2013 | Bowles et al. | |
| 2002/0170336 A1 | | 11/2002 | Carter | |
| 2004/0034968 A1 | | 2/2004 | Williams | |
| 2004/0118251 A1 | | 6/2004 | Wilson et al. | |
| 2004/0144154 A1 | | 7/2004 | Steiner | |
| 2008/0047319 A1 | * | 2/2008 | Thibault | 72/416 |
| 2009/0031778 A1 | | 2/2009 | Hamm et al. | |
| 2009/0277310 A1 | | 11/2009 | Bell | |
| 2010/0024169 A1 | * | 2/2010 | Self | 16/354 |
| 2011/0000136 A1 | | 1/2011 | Brun | |
| 2011/0097138 A1 | | 4/2011 | Eikelenboon | |
| 2011/0271486 A1 | | 11/2011 | Wang et al. | |
| 2012/0011723 A1 | * | 1/2012 | Flaten | 30/28 |
| 2013/0125610 A1 | | 5/2013 | Bowles et al. | |

* cited by examiner

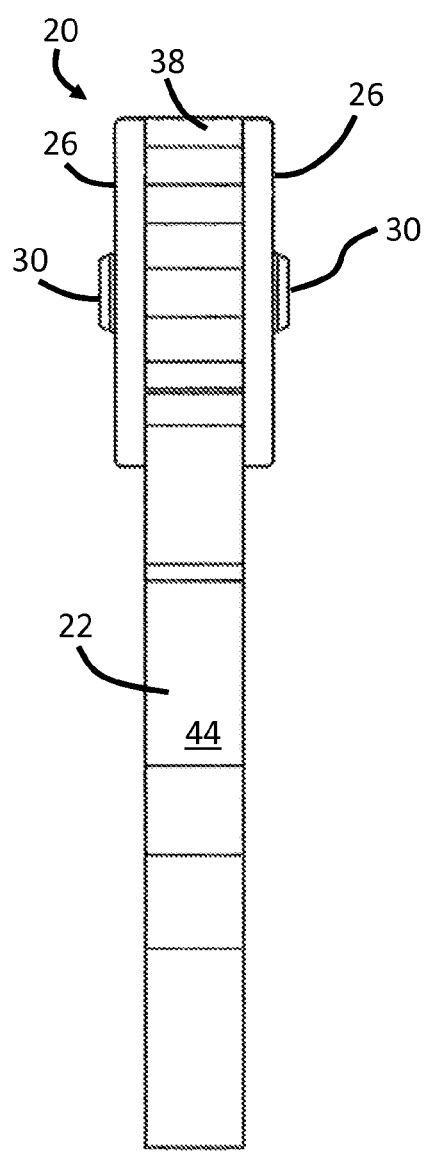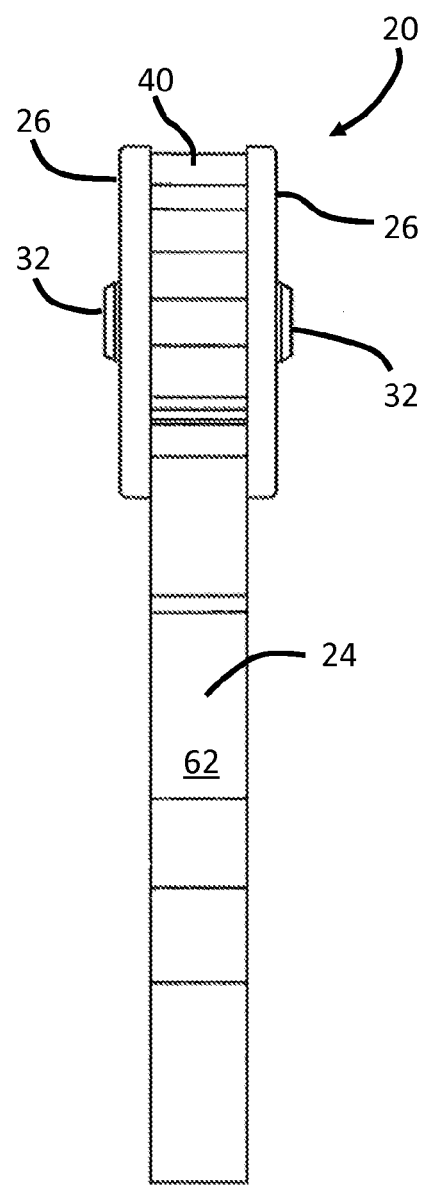
Fig. 3
Fig. 4

CRIMPING TOOL

BACKGROUND OF THE INVENTION

The subject matter disclosed herein relates to a crimping tool for nonmetallic tubing, and in particular to a crimping tool capable of crimping a plurality of different size rings.

Crimping tools are provided in a wide variety of configurations to accommodate various components, such as ring members to be clamped about plastic pipes or other fittings for sealing components together. Although substantial forces are required to crimp a ring member in the desired position, most crimping tools are constructed in a manner which provides adequate mechanical advantage to enable the tools jaws to impart the desired amount of force to the ring members.

Crimping tools may be used with a wide variety of pipes and fittings. In a typical application, such in a residential plumbing system for example, these pipes and fittings may come in two or three different sizes, such as ⅜", ½", or ¾" for example. In some applications a fourth size, such as 1" for example, may also be used. These types of applications resulted in the user needing to carry multiple tools to the job site to accommodate each of the different size ring members. Alternatively, some crimping tools include interchangeable fittings that allow a single tool to crimp multiple size rings.

Accordingly, while existing crimping tools are suitable for their intended purposes the need for improvement remains, particularly in providing a compact tool capable of crimping a variety of sizes of ring members.

BRIEF DESCRIPTION OF THE INVENTION

According to one aspect of the invention, a tool for crimping a ring member on a pipe is provided. The tool includes a first arm having a plurality of first slots on a first side and at least one second slot on a second side. Each slot of the plurality of first slots is a different size diameter, and wherein the at least one second slot has a different diameter from the plurality of first slots, the arm movable between a first position and a second position. A second arm is operably coupled to rotate relative to the first arm, the second arm having a plurality of third slots on a third side and at least one fourth slot on a fourth side. Wherein each of the plurality of third slots are sized and positioned to cooperate with one of the plurality of first slots when in the first position to crimp the ring member. The at least one fourth slot is sized and positioned to cooperate with the at least one second slot when in the second position to crimp the ring member.

According to another aspect of the invention, another tool for crimping a ring member on a pipe is provided. The tool includes a first arm movable between a first position and a second position. The first arm includes a first side and a second side. The first side includes a first semi-circular slot having a first diameter and an adjacent second semi-circular slot having a second diameter the second diameter being smaller than the first diameter. The second side includes a least one third semi-circular slot having a third diameter that is a different size from the first diameter and the second diameter. A second arm is operably coupled to the first arm and rotatable between a third position and a fourth position, the second arm includes a third side disposed opposite the first side and a fourth side. The third side includes a fourth semi-circular slot having a fourth diameter arranged opposite the first semi-circular slot in the third position, the fourth diameter being the same as the first diameter. The third side includes fifth semi-circular slot having a fifth diameter arranged opposite the second semi-circular slot in the third position, the fifth diameter being the same as the second diameter. The fourth side includes at least one sixth semi-circular slot having a sixth diameter arranged opposite the at least one third semi-circular slot in the fourth position, the sixth diameter being the same as the third diameter.

According to yet another aspect of the invention, yet another tool for crimping a ring member on a pipe is provided. The tool includes a frame member. A first arm is rotationally coupled on a first end to the frame member, the first arm having at least one first slot on a first side and at least one second slot on an opposing second side. A second arm is rotationally coupled on a second end to the frame member, the second arm having at least one third slot on a third side and at least one fourth slot on an opposing fourth side, wherein the at least one third slot is disposed opposite the at least one first slot and the at least one fourth slot is disposed opposite the at least one second slot.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is second side view of the embodiment of FIG. 1;

FIG. 4 is a third side view of the embodiment of FIG. 1;

Figure 1:
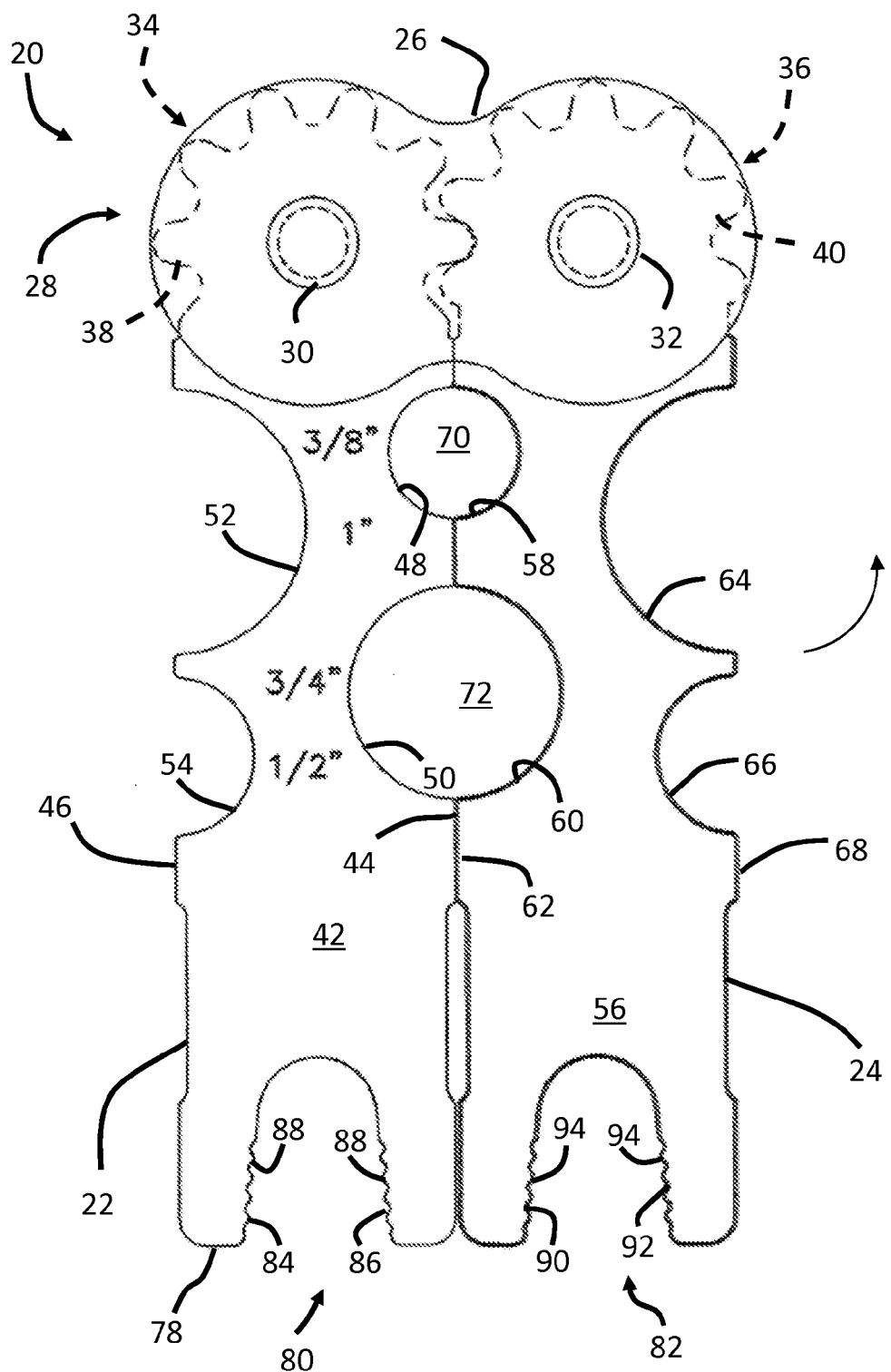
FIG. 1 is a first side view of an embodiment of the invention in a first position.

The detailed description explains embodiments of the invention, together with advantages and features, by way of example with reference to the drawings.

DETAILED DESCRIPTION OF THE INVENTION

Referring now to FIGS. 1-6, an embodiment of a crimping tool 20 is shown. The crimping tool 20 includes a first arm 22 and a second arm 24 pivotally coupled to a frame 26 on a first end 28. In one embodiment, the crimping tool 20 includes a pair of frames 26 disposed on opposing sides of the arms 22, 24. The arms 22, 24 are made from a suitable material capable of transferring the crimping forces that are applied to a ring member when coupling a polymer pipe to a fitting (not shown). In the exemplary embodiment, the arms are made from steel.

The arms 22, 24 are coupled to the frame 26 by a pivot 30, 32 respectively. In the exemplary embodiment, the pivots 30, 32 are rivets that couple the arms 22, 24 to the frame 26 and prevent the arms 22, 24 from being separated from the frame 26 or each other. Adjacent the pivots 30, 32, each arm includes a gear 34, 36. In the exemplary embodiment, the gears 34, 36 are integrally formed on the end 28 of the arms 22, 24. In another embodiment, the gears 34, 36 are a separate component that is rigidly coupled to the arms 22, 24. Each of the gears 34, 36 has a plurality of teeth 38, 40 respectively. The gears 34, 36 are arranged such that the teeth 38 of gear 34 are in a meshed engagement with the teeth 40 of gear 36. As a result, the movement of an arm (e.g. arm 22) causes the other arm (e.g. arm 24) to rotate in a synchronized manner relative to the other arm. It has been found that the synchronization of the arm 22, 24 movements provides advantages in reducing the tolerance that may be achieved on the resulting crimp of the ring member to be in compliance with American Society of Testing and Materials (ASTM) standard F1807. In another embodiment, the gears 34, 36 are omitted and the arms 22, 24 are allowed to freely rotate relative to each other.

In the exemplary embodiment, the first arm 22 includes a generally planar face 42 with a pair of opposing sides 44, 46 that extend perpendicular to the face 42. The first side 44 includes a plurality of slots 48, 50 that extend perpendicular to the face 42. The slots 48, 50 have a semi-circular shape and are sized to receive a ring member during use. The slots 48, 50 each have a different size diameter allowing the slots 48, 50 to receive a different size ring member during use. Similarly, the second side 46 includes at least one semi-circular slot 52 arranged substantially perpendicular to the face 42. In the embodiment of FIGS. 1-6, the second side 46 includes a plurality of slots 52, 54. In one embodiment, the slots 52, 54 and the slots 48, 50 are arranged offset from each other to reduce the width of the crimping tool 20.

It should be appreciated that the second arm 24 is configured as a mirror image of the first arm 22 and includes a planar face 56, first plurality of slots 58, 60 arranged on a third side 62 and slots 64, 66 on a fourth side 68. The slots 48, 50 and slots 58, 60 are arranged to cooperate to form a pair of circular openings 70, 72 when the crimping tool 20 is in the first position such that the first side 44 is rotated adjacent to or in contact with the third side 62 (FIG. 1). Similarly, when in the second position such that the second side 46 is rotated adjacent to or in contact with the fourth side 68 (FIG. 2), the slots 52, 54 cooperate with the slots 64, 66 to form another pair of circular openings 74, 76. In one embodiment, the openings 70, 72, 74, 76 are each sized to receive a different ring member.

In one embodiment, the larger diameter openings are positioned closer to the pivots 30, 32 to provide an increased mechanical advantage to these openings relative to the openings farther from the pivot. It should be appreciated that this arrangement facilitates the crimping of larger rings. It should also be appreciated that by having slots sized to receive the ring members on opposing sides, the configuration of the crimping tool 20 may be reversed to allow the crimping tool 20 to be used with multiple sizes of ring members. This provides advantages in reducing the number of tools a user has to carry to a job site, reducing time in finding the right tool and reducing the weight of the users tool box.

The arms 22, 24 each further include a second end 78 opposite the first end 28. In one embodiment, the second end 78 includes a slot 80, 82 on the end of each arm 22, 24. The slots 80, 82 are arranged substantially perpendicular to the face 42. The slot 80 includes a pair of opposing sidewalls 84, 86. The side walls 84, 86 may include a plurality of ridges or teeth 88. Similarly the slot 82 includes a pair of opposing sidewalls 90, 92, each may have a plurality of teeth 94. In the exemplary embodiment, the sidewalls 84, 86, 90, 92 are tapered or sloped inward such that the end of the slot distal from the end 78 is narrower than the opening at the end 78.

Figure 2:
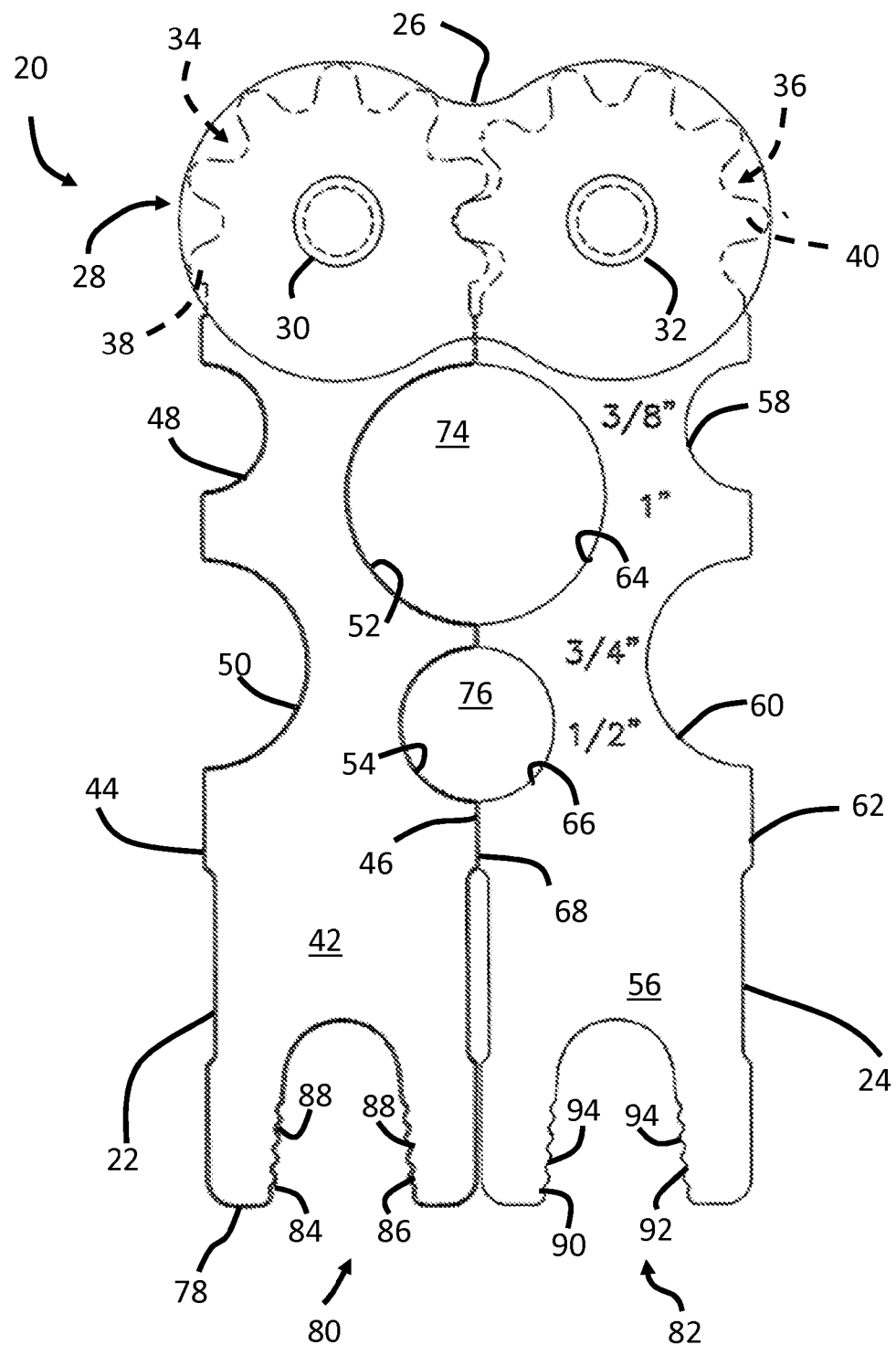
FIG. 2 is a side view of the embodiment of FIG. 1 in a second position.
Figure 5:
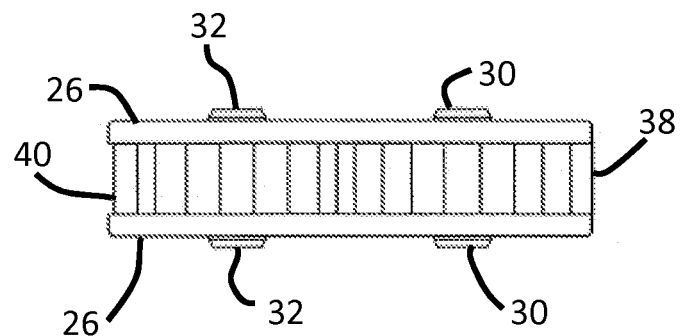
FIG. 5 is a first end view of the embodiment of FIG. 1.
Figure 6:
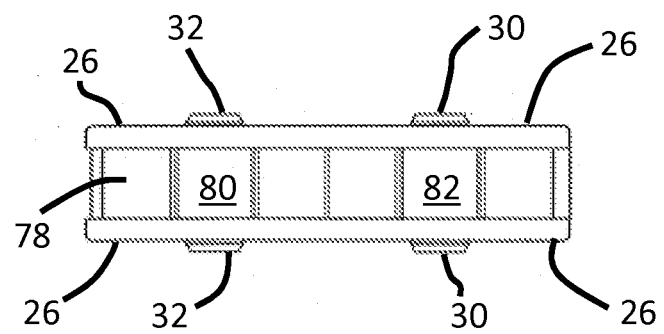
FIG. 6 is a second end view of the embodiment of FIG. 1.
Figure 7:
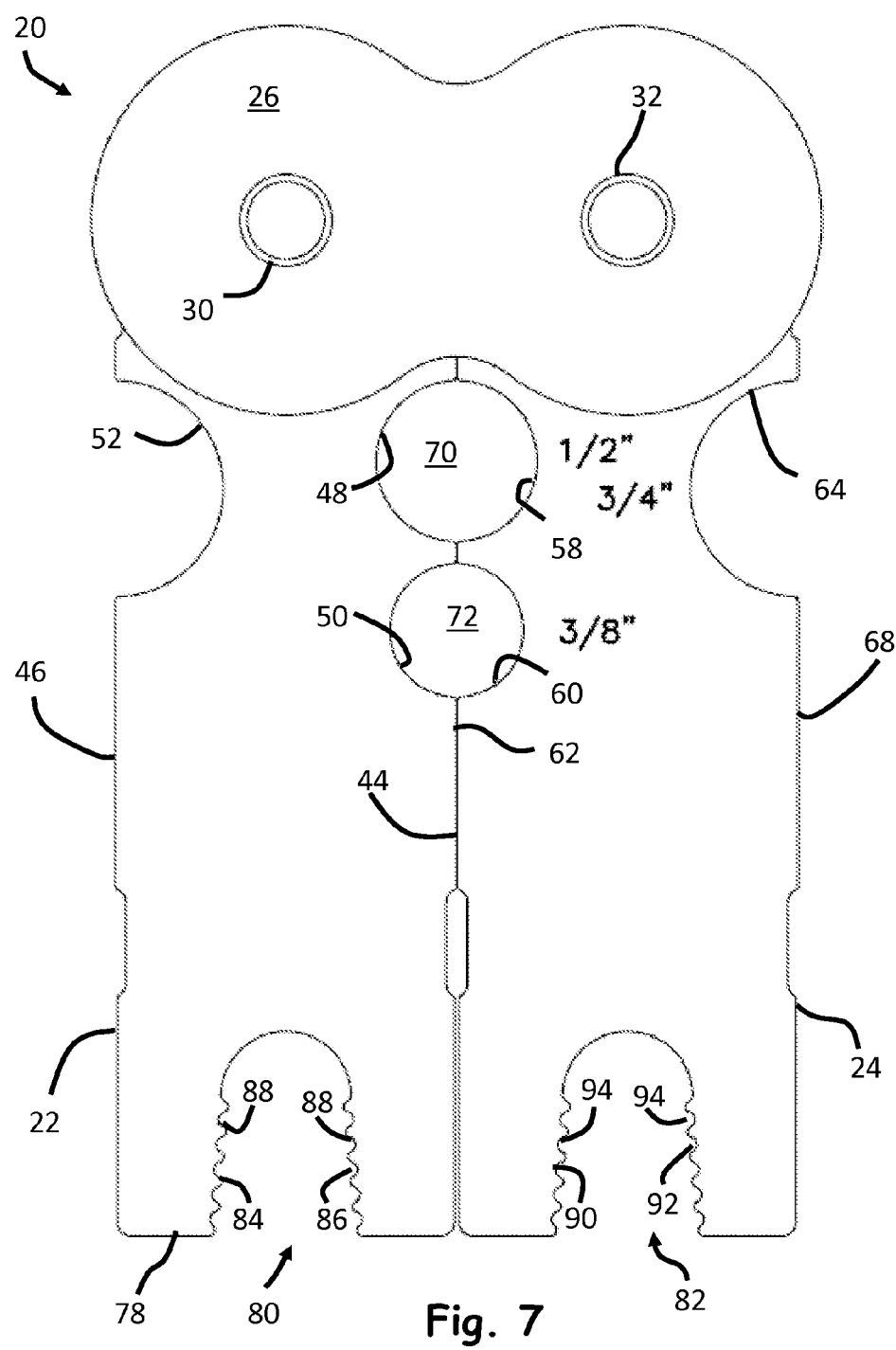
FIG. 7 is a first side view of another embodiment of the invention in a first position.
Figure 8:
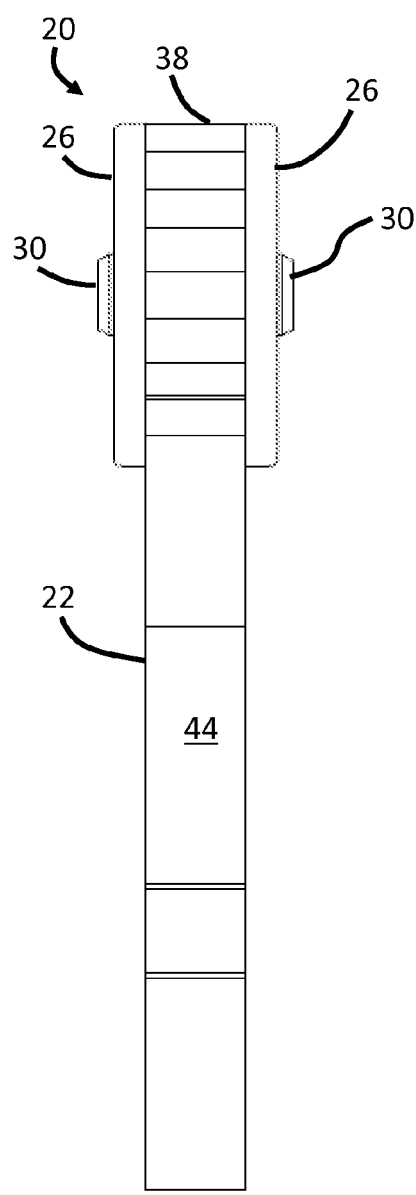
FIG. 8 is a second side view of the embodiment of FIG. 7.
Figure 9:
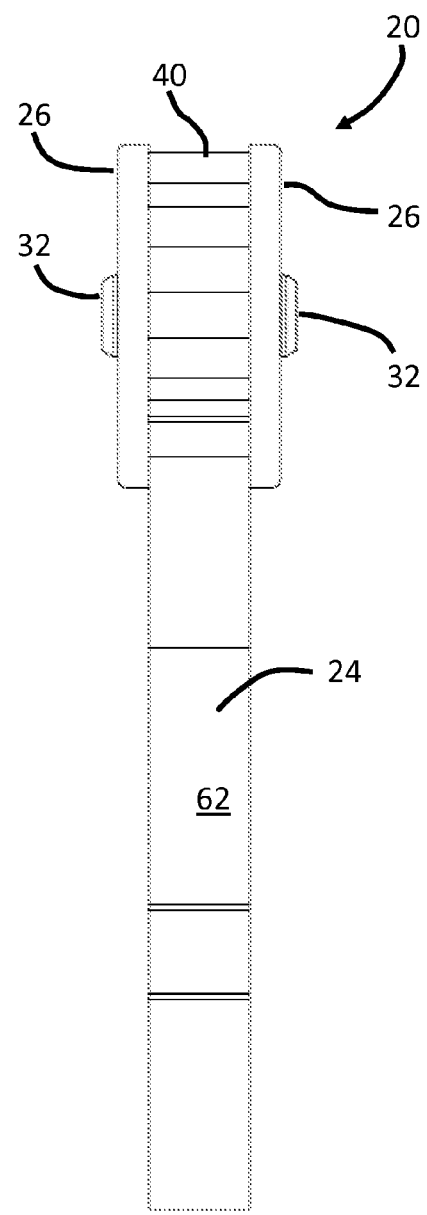
FIG. 9 is a third side view of the embodiment of FIG. 7.
Figure 10:
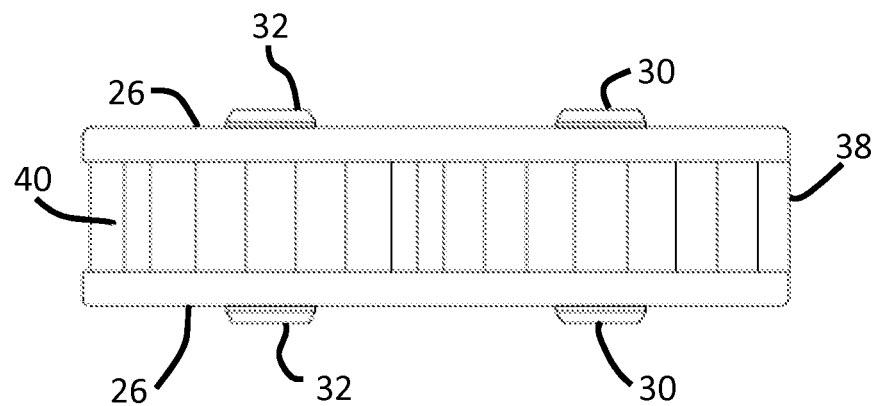
FIG. 10 is a first end view of the embodiment of FIG. 7.
Figure 11:
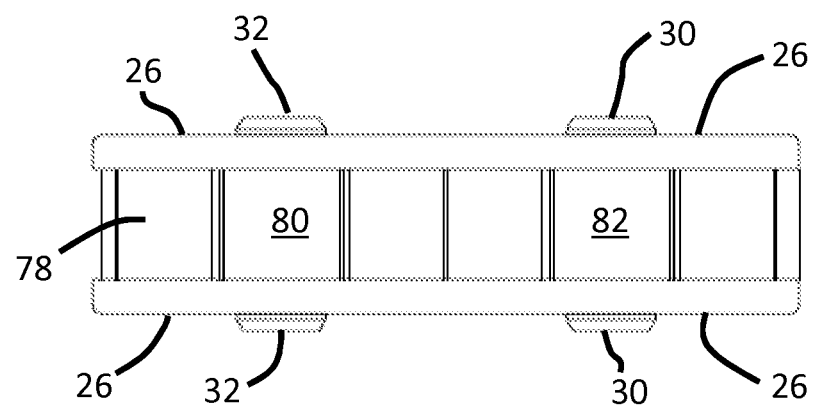
FIG. 11 is a second end view of the embodiment of FIG. 7.

The slots 80, 82 are sized to receive the jaws of pliers (not shown) that are inserted by the user during the crimping activity. By providing the slots 80, 82 with the pair of opposing sidewalls, the slots 80, 82 may be engaged by the pliers in either the first position (FIG. 1) or when configured in the second position (FIG. 2).

Referring now to FIGS. 7-12 a crimping tool 20 is shown having three ring member slots. In this embodiment, the first side 44 and third side 62 include a pair of slots 48, 50 and pair of slots 58, 60 respectively. In this embodiment, the slots 48, 58 cooperate to form an opening sized for a ring member for a ½ inch pipe and the slots 50, 60 cooperate to form an opening sized to fit a ring member for a ⅜ inch pipe. On the second side 46 and fourth side 68 each include a single slot 52, 64. In this embodiment, the opening formed by the slots 52, 64 (FIG. 12) is sized to receive a ring member for a ¾ inch pipe. It should be appreciated that by placing the openings sized for the larger ring members (e.g. sized to fit a ½ inch pipe and ¾ inch pipe) closer to the pivots 30, 32 additional mechanical advantage may be gained on the larger sizes than if they were position of the opening sized to fit a ⅜ inch pipe.

Figure 12:
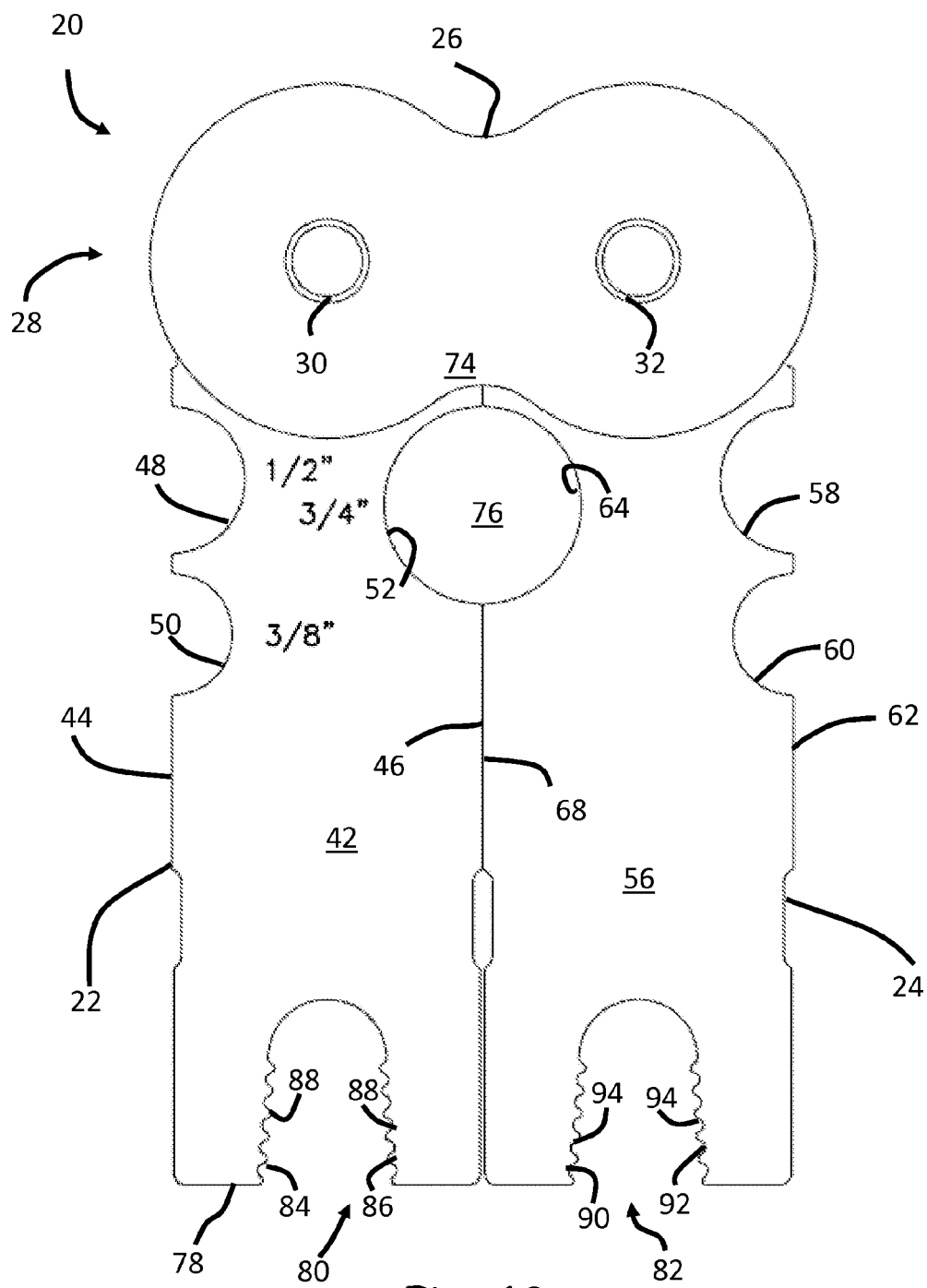
FIG. 12 is a side view of the embodiment of FIG. 7 in a second position.
Figure 13:
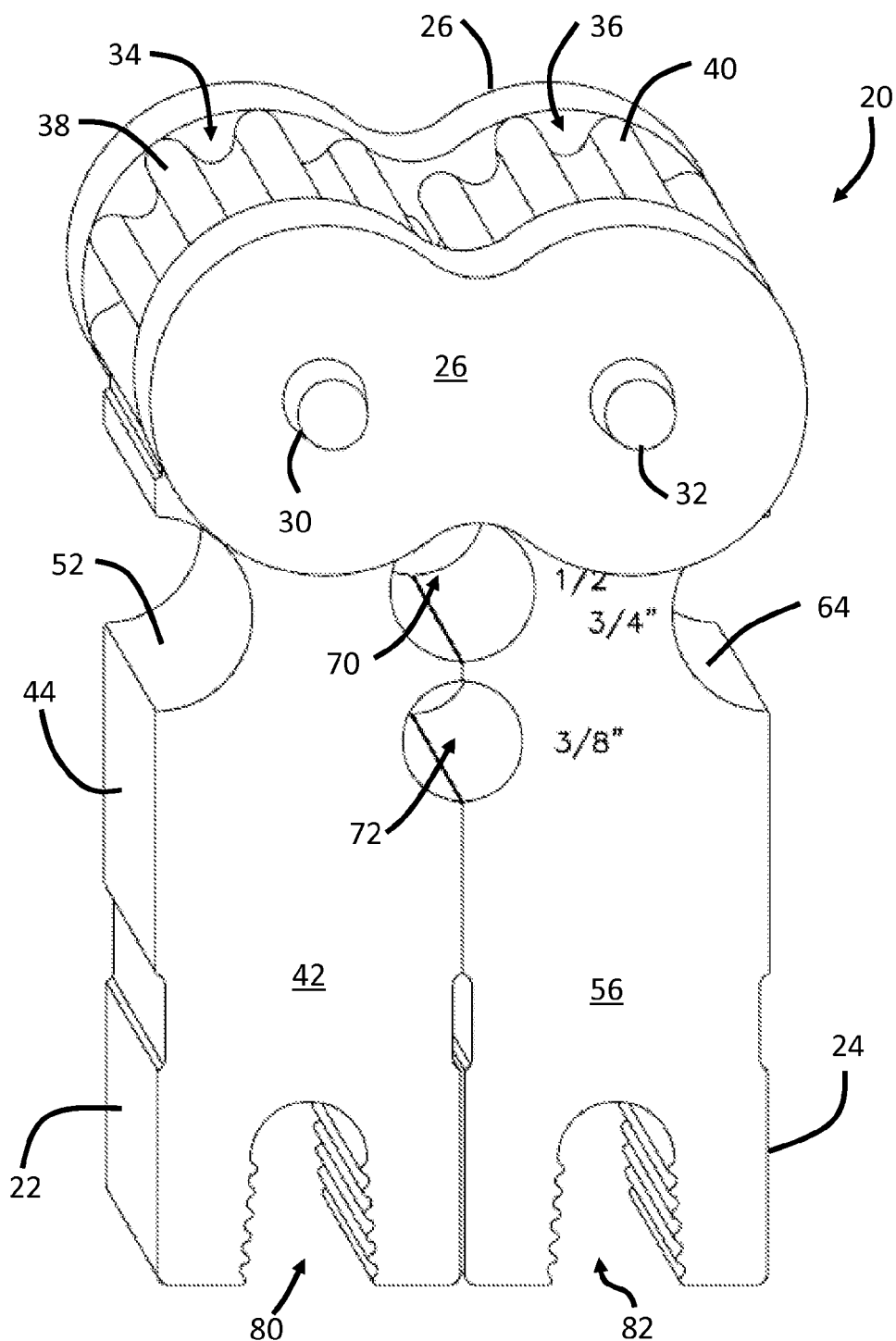
FIG. 13 is a perspective view of the embodiment of FIG. 7.

In operation, the ring member is installed on to the desired tubing or pipe adjacent an end. The end of the tubing is slid onto a fitting and the ring is positioned over the tube and fitting. The crimping tool 20 is opened allowing the ring member to pass between the first side 44 and third side 62 when in the first position (FIG. 1, FIG. 7) or between the second side 46 and the fourth side 68 when in the second position (FIG. 2, FIG. 12). When the ring member is positioned within the desired slots, the user inserts the jaws of the pliers into the slots 80, 82. By squeezing the handles of the pliers, the user obtains the desired amount of mechanical advantage to crimp the ring member onto the tube/fitting assembly. The crimping of the ring member secures the tubing onto the fitting.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool for crimping a ring member on a pipe, the tool comprising:

a first arm having a plurality of first slots on a first side and at least one second slot on a second side, wherein each slot of the plurality of first slots is a different size diameter, and wherein the at least one second slot has a different diameter from the plurality of first slots, the arm rotatable between a first position and a second position about a first pivot, the first arm arranged to rotate about a first end, the first end having a plurality of first gear teeth, the first gear teeth extending more than 180 degrees about the first end and having a center of rotation that is coaxial with the first pivot; and, a second arm operably coupled to rotate relative to the first arm, the second arm having a plurality of third slots on a third side and at least one fourth slot on a fourth side, wherein each of the plurality of third slots are sized and positioned to cooperate with one of the plurality of first slots when in the first position to crimp the ring member, and wherein the at least one fourth slot is sized and positioned to cooperate with the at least one second slot when in the second position to crimp the ring member, the second arm arranged to rotate about a second pivot on a second end, the second end having a plurality of second gear teeth extending more than 180 degrees about the second end and having a center of rotation that is coaxial with the second pivot;

wherein the first gear teeth and second gear teeth cooperate to rotate the second arm relative to the first arm when the first arm is moved 180 degrees from the first position to the second position, wherein the first arm includes a first pair of opposing surfaces on a third end, the third end being opposite the first end, the first pair of opposing surfaces defining a first engaging slot; and the second arm includes a second pair of opposing surfaces on a fourth end, the fourth end being opposite the second end, the second pair of opposing surfaces defining a second engaging slot.

2. The tool of claim 1 wherein the plurality of first slots includes a first slot having a first diameter and a second slot having a second diameter, the first slot being disposed closer to the first end than the second slot.

3. The tool of claim 2 wherein the first diameter is sized to fit a 0.5 inch pipe and the second diameter is sized to fit 0.375 inch pipe.

4. The tool of claim 1 wherein the at least one second slot has a diameter sized to fit a 0.75 inch pipe.

5. The tool of claim 1 wherein the at least one second slot has a diameter sized to fit a 1.0 inch pipe.

6. The tool of claim 1, wherein the first engaging slot and the second engaging slot are configured to receive jaws of pliers.

7. The tool of claim 1, wherein at least one of the first engaging slot and the second engaging slot include a plurality of ridges or teeth.

8. The tool of claim 1, wherein at least one of the first engaging slot and the second engaging slot is tapered in a direction toward the respective first or second end.

9. A tool for crimping a ring member on a pipe, the tool comprising:
a first arm rotatable between a first position and a second position about a first pivot, the first arm including:
a first side and a second side;
the first side having a first semi-circular slot having a first diameter and an adjacent second semi-circular slot having a second diameter the second diameter being smaller than the first diameter;
the second side having at least one third semi-circular slot having a third diameter that is a different size from the first diameter and the second diameter;
a first gear arranged on an end of the first arm, the first gear extending more than 180 degrees about the end of the first arm and having a center of rotation that is coaxial with the first pivot;
a second arm operably coupled to the first arm and rotatable between a third position and a fourth position about a second pivot, the second arm including:
a third side disposed opposite the first side and a fourth side;
the third side having a fourth semi-circular slot having a fourth diameter arranged opposite the first semi-circular slot in the third position, the fourth diameter being the same as the first diameter;
the third side having fifth semi-circular slot having a fifth diameter arranged opposite the second semi-circular slot in the third position, the fifth diameter being the same as the second diameter;
the fourth side having at least one sixth semi-circular slot having a sixth diameter arranged opposite the at least one third semi-circular slot in the fourth position, the sixth diameter being the same as the third diameter;
a second gear arranged on an end of the second arm adjacent the first gear, the second gear extending more than 180 degrees about the end of the first arm and having a center of rotation that is coaxial with the second pivot; and
wherein the first gear and second gear cooperate to rotate the second arm 180 degrees from the third position to the fourth position in response to the first arm moving from the first position to the second position,
wherein the first arm includes a first pair of opposing surfaces on a third end the third end being opposite the first end, the first pair of opposing surfaces defining a first engaging slot; and
the second arm includes a second pair of opposing surfaces on a fourth end, the fourth end being opposite the second end, the second pair of opposing surfaces defining a second engaging slot.

10. The tool of claim 9 further comprising a frame member, wherein the first gear and the second gear are rotationally coupled to the frame member.

11. The tool of claim 9 wherein the first diameter is sized to receive a 0.5 inch diameter ring member.

12. The tool of claim 9 wherein the second diameter is sized to receive a 0.375 inch diameter ring member.

13. The tool of claim 9 wherein the third diameter is sized to receive a 0.75 inch diameter ring member.

14. The tool of claim 9 wherein:
the second side further includes a seventh semi-circular slot adjacent to the at least one third semi-circular slot; and
the fourth side further includes an eighth semi-circular slot adjacent to the at least one sixth semi-circular slot.

15. The tool of claim 9, wherein at least one of the first engaging slot and the second engaging slot include a plurality of ridges or teeth.

16. The tool of claim 9, wherein at least one of the first engaging slot and the second engaging slot is tapered in a direction toward the respective first or second end.

17. A tool for crimping a ring member on a pipe, the tool comprising:
a frame member;
a first arm rotationally coupled on a first end by a first pivot to the frame member, the first arm having at least one first slot on a first side and at least one second slot on an opposing second side, the first arm having a first gear formed at the first end, the first gear extending more than 180 degrees about the first end and having a center of rotation that is coaxial with the first pivot; and,
a second arm rotationally coupled on a second end by a second pivot to the frame member, the second arm having at least one third slot on a third side and at least one fourth slot on an opposing fourth side, wherein the at least one third slot is disposed opposite the at least one first slot and the at least one fourth slot is disposed opposite the at least one second slot, the second arm having a second gear formed at the second send, the second gear extending more than 180 degrees about the second end and having a center of rotation that is coaxial with the second pivot;

wherein the first gear engages the second gear to rotate the second arm 180 degrees in response to the first arm being rotated from a first position to a second position, wherein the first arm includes a first pair of opposing surfaces on a third end, the third end being opposite the first end, the first pair of opposing surfaces defining a first engaging slot; and the second arm includes a second pair of opposing surfaces on a fourth end, the fourth end being opposite the second end, the second pair of opposing surfaces defining a second engaging slot.

18. The tool of claim 17 wherein:

the at least one first slot and the at least one second slot are arranged closer to the first end than the third end; and, the at least one third slot and the at least one fourth slot are arranged closer to the second end than the fourth end.

19. The tool of claim 17, wherein the first engaging slot and the second engaging slot are configured to receive jaws of pliers.

20. The tool of claim 17, wherein at least one of the first engaging slot and the second engaging slot include a plurality of ridges or teeth.

21. The tool of claim 17, wherein at least one of the first engaging slot and the second engaging slot is tapered in a direction toward the respective first or second end.

* * * * *